US010800568B2

(12) United States Patent
Schinelli

(10) Patent No.: US 10,800,568 B2
(45) Date of Patent: Oct. 13, 2020

(54) LABELING ASSEMBLY FOR LABELING MACHINES

(71) Applicant: P.E. LABELLERS S.P.A., Porto Mantovano (IT)

(72) Inventor: Nicola Schinelli, Mantova (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 3 days.

(21) Appl. No.: 15/780,703

(22) PCT Filed: Dec. 1, 2016

(86) PCT No.: PCT/EP2016/079416
§ 371 (c)(1),
(2) Date: Jun. 1, 2018

(87) PCT Pub. No.: WO2017/093392
PCT Pub. Date: Jun. 8, 2017

(65) Prior Publication Data
US 2018/0354670 A1 Dec. 13, 2018

(30) Foreign Application Priority Data
Dec. 4, 2015 (IT) .................... 102015000080271

(51) Int. Cl.
*B65C 9/40* (2006.01)
*B65C 9/00* (2006.01)
(Continued)

(52) U.S. Cl.
CPC ............... *B65C 9/40* (2013.01); *B65C 3/06* (2013.01); *B65C 9/00* (2013.01); *B65C 9/02* (2013.01);
(Continued)

(58) Field of Classification Search
CPC .... B65C 9/40; B65C 3/06; B65C 9/00; B65C 9/02; B65C 9/10; F16M 1/02; F16P 1/02; F16P 3/08; B23Q 3/02
See application file for complete search history.

(56) References Cited

U.S. PATENT DOCUMENTS

2004/0094253 A1* 5/2004 Jenkins ................... B65C 1/021
156/64
2013/0139969 A1 6/2013 Giuliani
(Continued)

FOREIGN PATENT DOCUMENTS

EP 2778082 9/2014
EP 2792928 10/2014
(Continued)

OTHER PUBLICATIONS

PCT, International Search Report and Written Opinion, International Application No. PCT/EP2016/079416; dated Jan. 30, 2017, 9 pages.
(Continued)

*Primary Examiner* — George R Koch
(74) *Attorney, Agent, or Firm* — Thompson Hine L.L.P.

(57) ABSTRACT

A labeling assembly for labeling machines which includes a base frame which is adapted to be associated with a conveyor of containers to be labeled and which supports elements for labeling the containers; elements are provided for at least partially delimiting the work area of the labeling elements; the delimiting elements include at least one protective body which can move slideably, with respect to the base frame, between an active position, in which it is adapted to delimit at least partially the work area of the labeling elements, and at least one inactive position, which
(Continued)

is spaced with respect to the active position, in which it allows access from the outside to the work area of the labeling elements.

20 Claims, 22 Drawing Sheets

(51) Int. Cl.
    *F16M 1/02* (2006.01)
    *F16P 3/08* (2006.01)
    *F16P 1/02* (2006.01)
    *B65C 3/06* (2006.01)
    *B65C 9/02* (2006.01)
    *B65C 9/10* (2006.01)

(52) U.S. Cl.
    CPC ................. *B65C 9/10* (2013.01); *F16M 1/02* (2013.01); *F16P 1/02* (2013.01); *F16P 3/08* (2013.01)

(56) References Cited

U.S. PATENT DOCUMENTS

2014/0306393 A1* 10/2014 Hafner .................. B65C 9/00
    269/57
2015/0274438 A1* 10/2015 Carmichael ........... B65G 47/28
    156/60

FOREIGN PATENT DOCUMENTS

| WO | WO 2011/154980 | 12/2011 |
| WO | WO 2013/001551 | 1/2013 |

OTHER PUBLICATIONS

Italian Search Report, ITUB20156259, dated Jul. 22, 2016, 7 pages.

* cited by examiner

LABELING ASSEMBLY FOR LABELING MACHINES

This application is a 371 of PCT/EP2016/079416, filing date 12/01/2016.

The present invention relates to a labeling assembly for labeling machines.

Currently, labeling machines are known for labeling containers, such as bottles, jars or the like, which have a conveyor of the containers, which is usually constituted by a carousel that can rotate about a rotation axis and is provided with supporting pans for individual containers to be labeled.

Conventional labeling machines have, furthermore, a plurality of stations for processing the containers, which are arranged around the carousel and which comprise at least one labeling assembly for labeling the containers transiting on the carousel.

Typically, each labeling assembly comprises a base frame, which can be coupled stably or detachably to the fixed framework of the carousel and which supports labeling means, which make it possible to affix the labels, which are taken from adapted spools or from a magazine of labels, onto containers in transit on the carousel.

Multiple protection panels are mounted around the labeling means and make it possible to delimit the work area of the labeling means, so as to prevent accidental access thereto from outside during the operation of the machine.

Such protection panels can be removed individually from the base frame of the labeling assembly, in order to allow operators to carry out maintenance or repair interventions or to perform changes of format on the labeling means.

Once removed from the base frame, the panels are usually placed on the floor in proximity to the base frame, but often this is a hindrance to the convenient movements of the operators.

Solutions are also known in which the protection panels are individually hinged to the base frame, so as to be able to pass from a closed condition, in which they delimit the space around the labeling means, to an open condition, in which they make it possible for operators to access the labeling means, and vice versa.

In this case too, however, the protection panels can constitute an obstacle to the freedom of movement of the operators, especially in the area in which they are hinged to the base frame.

The aim of the present invention is to provide a labeling assembly that offers an adequate protection of the work area of the labeling means, preventing access thereto during the operation of the labeling means, and which, at the same time, allows easy and convenient access to the work area of the labeling means, during maintenance or repair interventions thereon.

Within this aim, an object of the present invention is to provide a labeling assembly that, in addition to offering the highest guarantees of reliability and safety, is also of practical use for the operators.

Another object of the present invention is to provide a labeling assembly that is very simple in structure and which is low cost.

This aim and these and other objects which will become better apparent hereinafter are achieved by a labeling assembly for labeling machines, according to the invention, as defined in claim 1.

Further characteristics and advantages of the invention will become better apparent from the description of some preferred, but not exclusive, embodiments of the labeling assembly, according to the invention, which are illustrated by way of non-limiting example in the accompanying drawings wherein.

Figure 1:
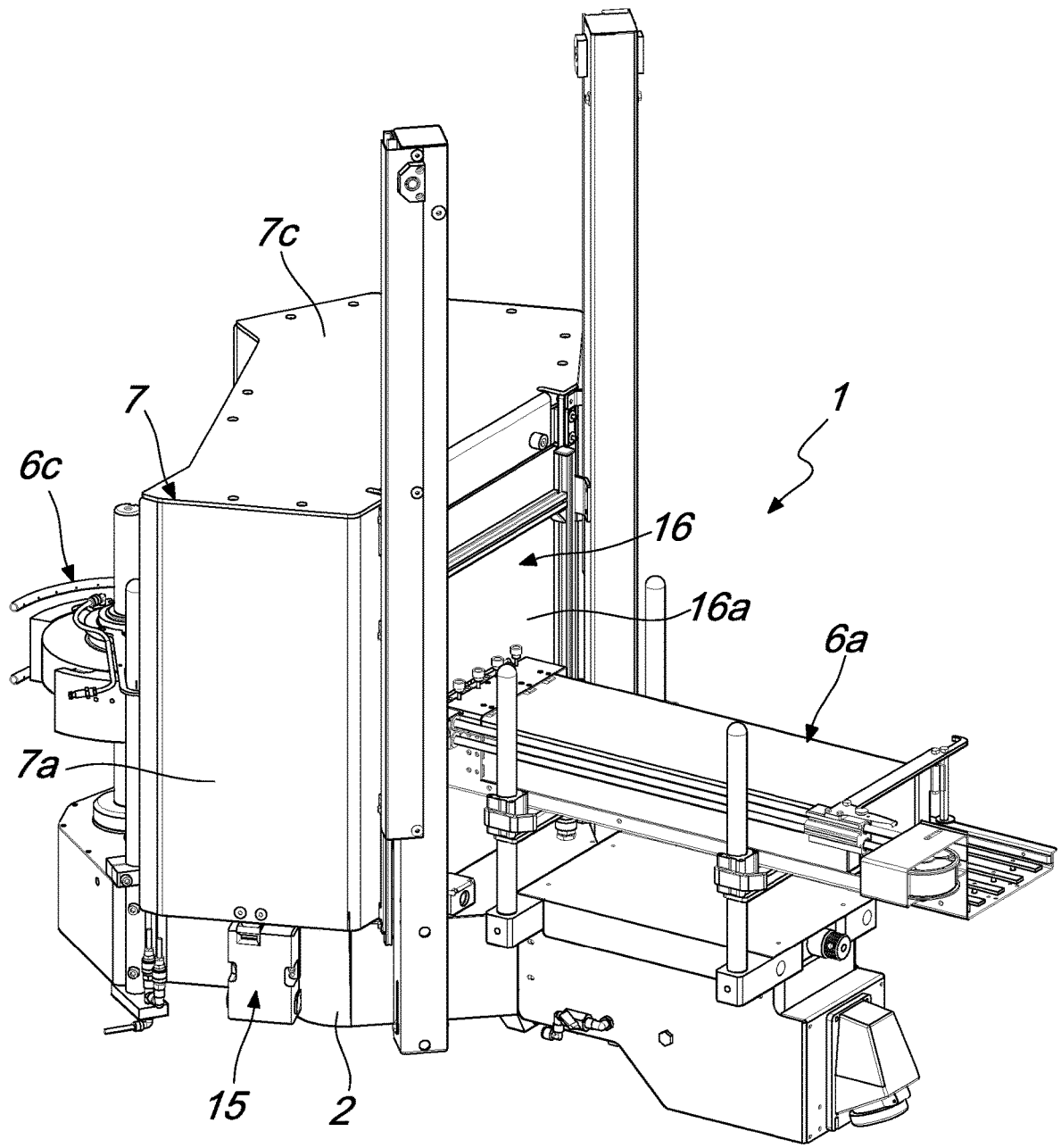
FIG. 1 is a partial perspective view of a labeling assembly according to the invention with a protective body in an active position thereof.

With reference to the figures, a labeling assembly for labeling machines, generally designated with the reference numeral 1, comprises a base frame 2 which is adapted to be associated with a conveyor 3 of containers 4 to be labeled, which is constituted, for example, by a rotating carousel 5.

Figure 7:
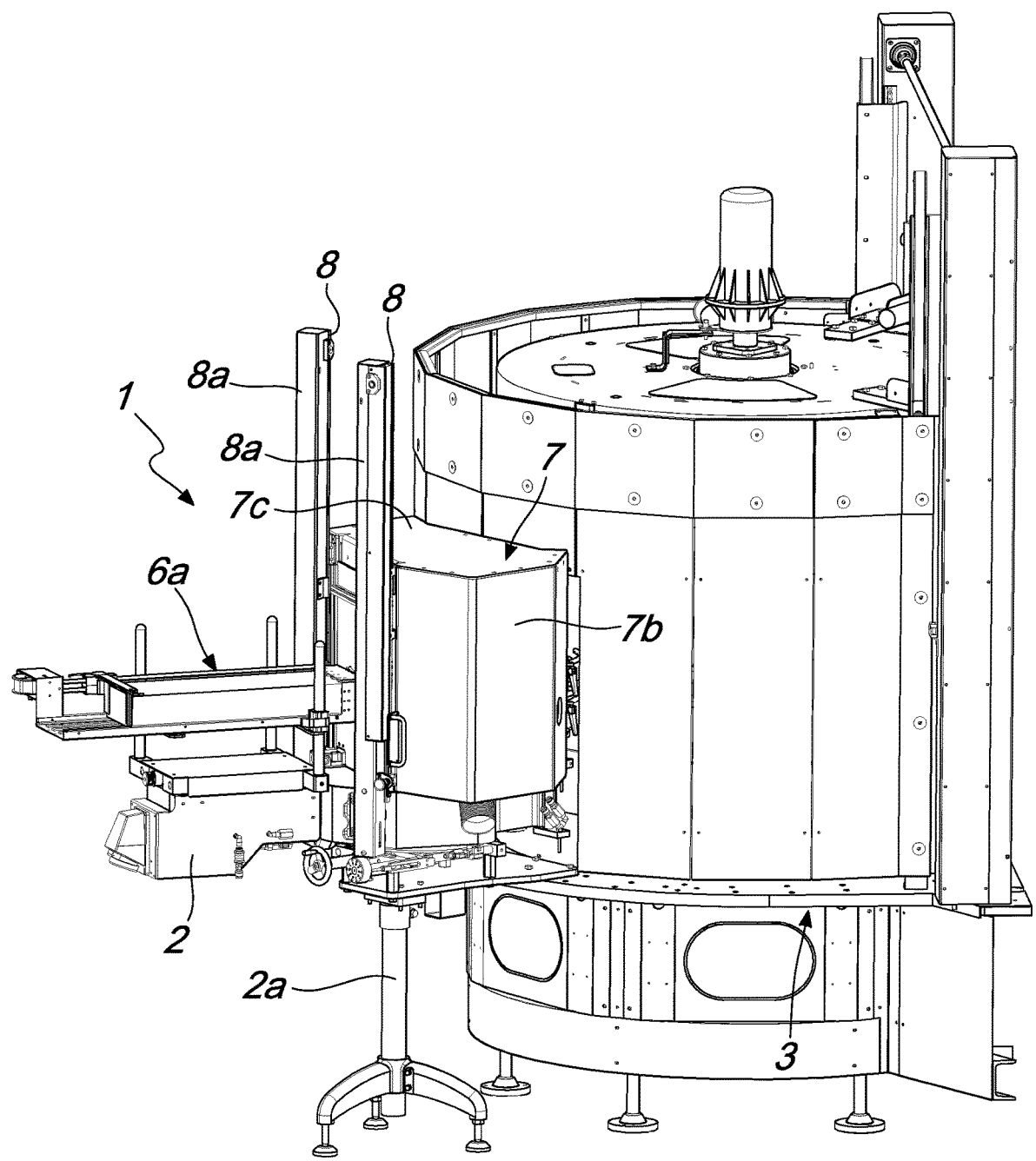
FIG. 7 is a perspective view of an embodiment of the labeling assembly according to the invention, associated with a conveyor of containers and with the protective body in the active position.
Figure 8:
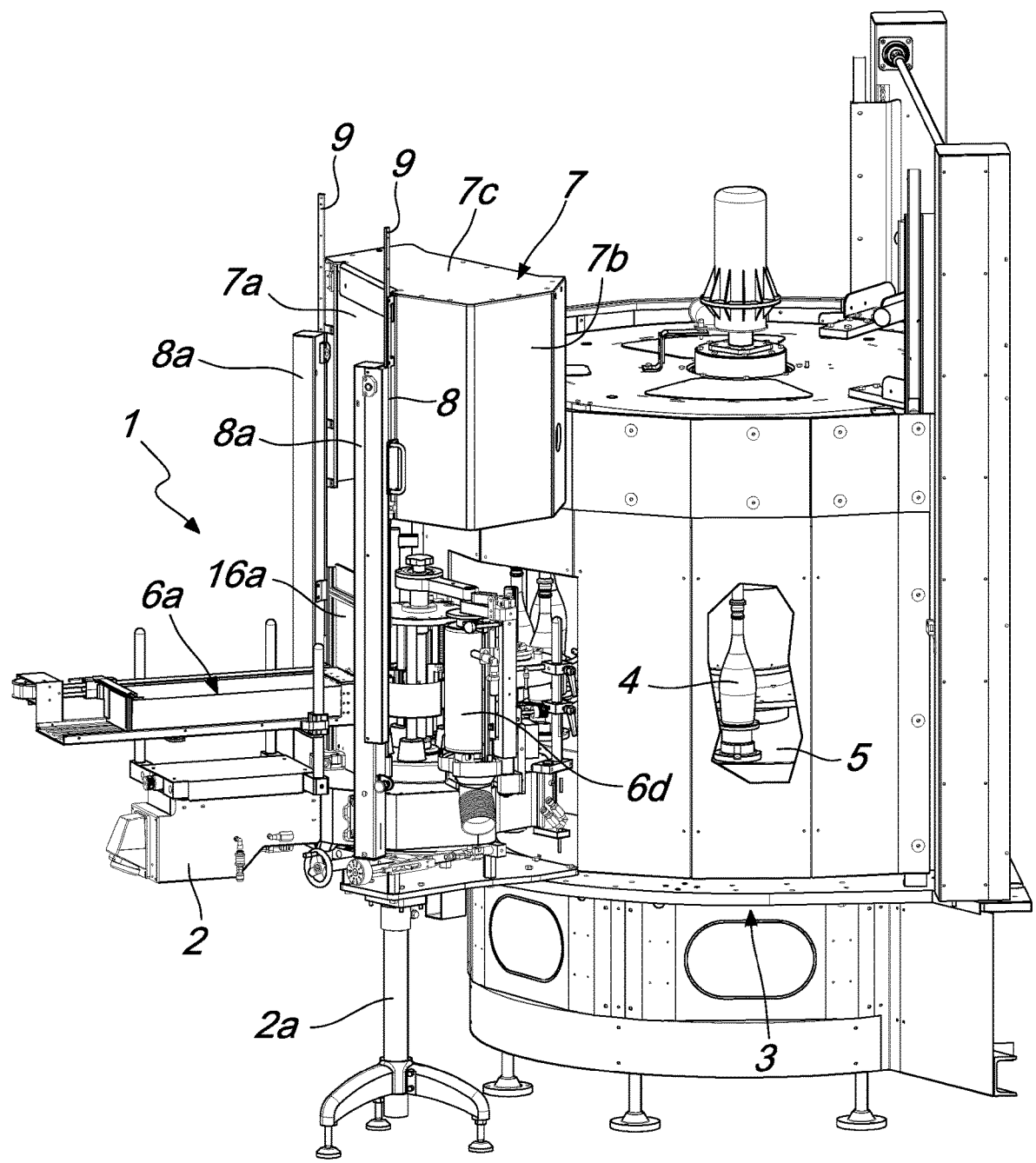
FIG. 8 shows the embodiment of FIG. 7 with the protective body in the inactive position and with parts of the conveyor shown in cutaway in order to show the containers in transit thereon.
Figure 9:
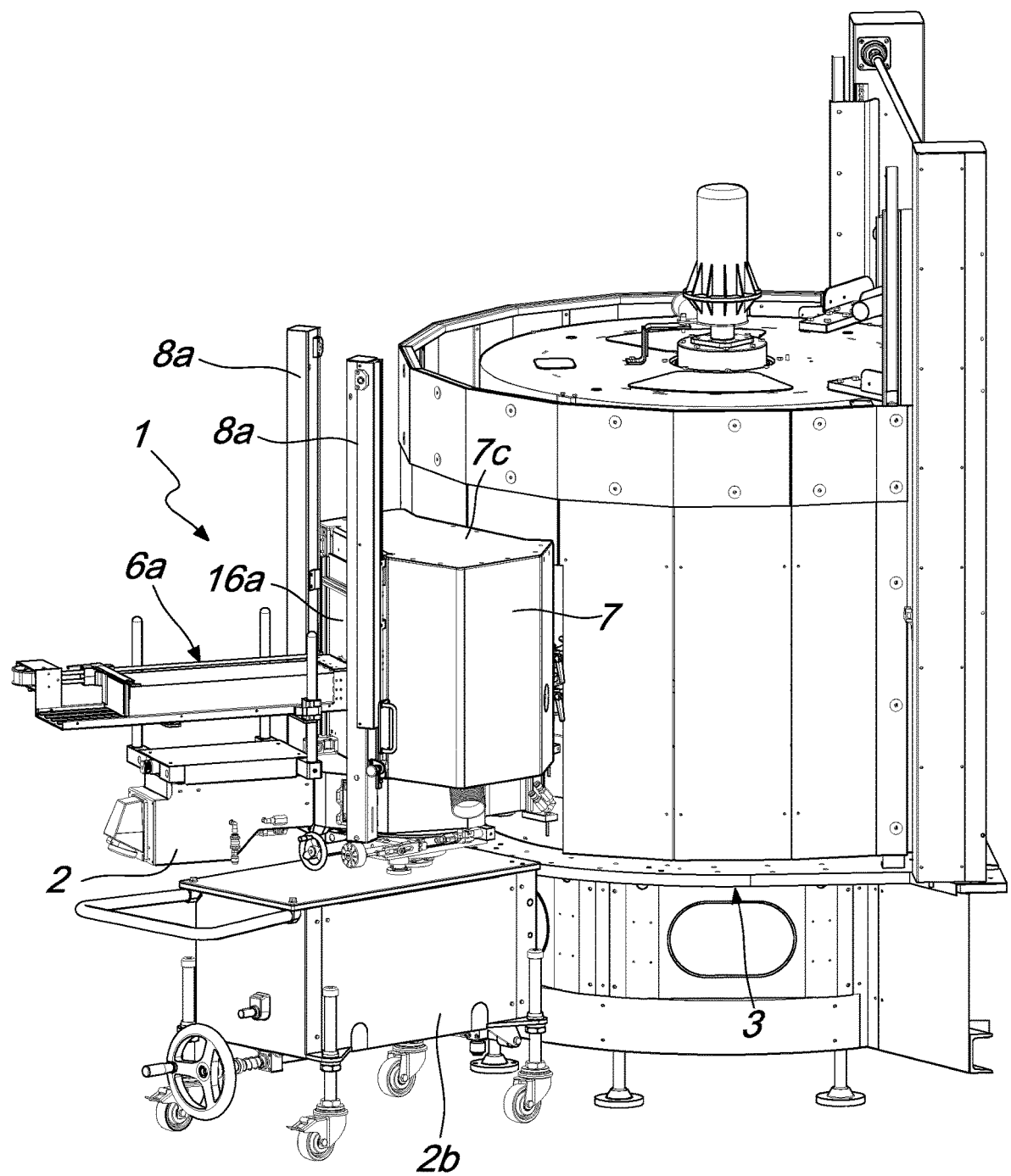
FIG. 9 is a perspective view of another embodiment of the labeling assembly according to the invention, associated with a conveyor of containers and with the protective body in the active position.
Figure 10:
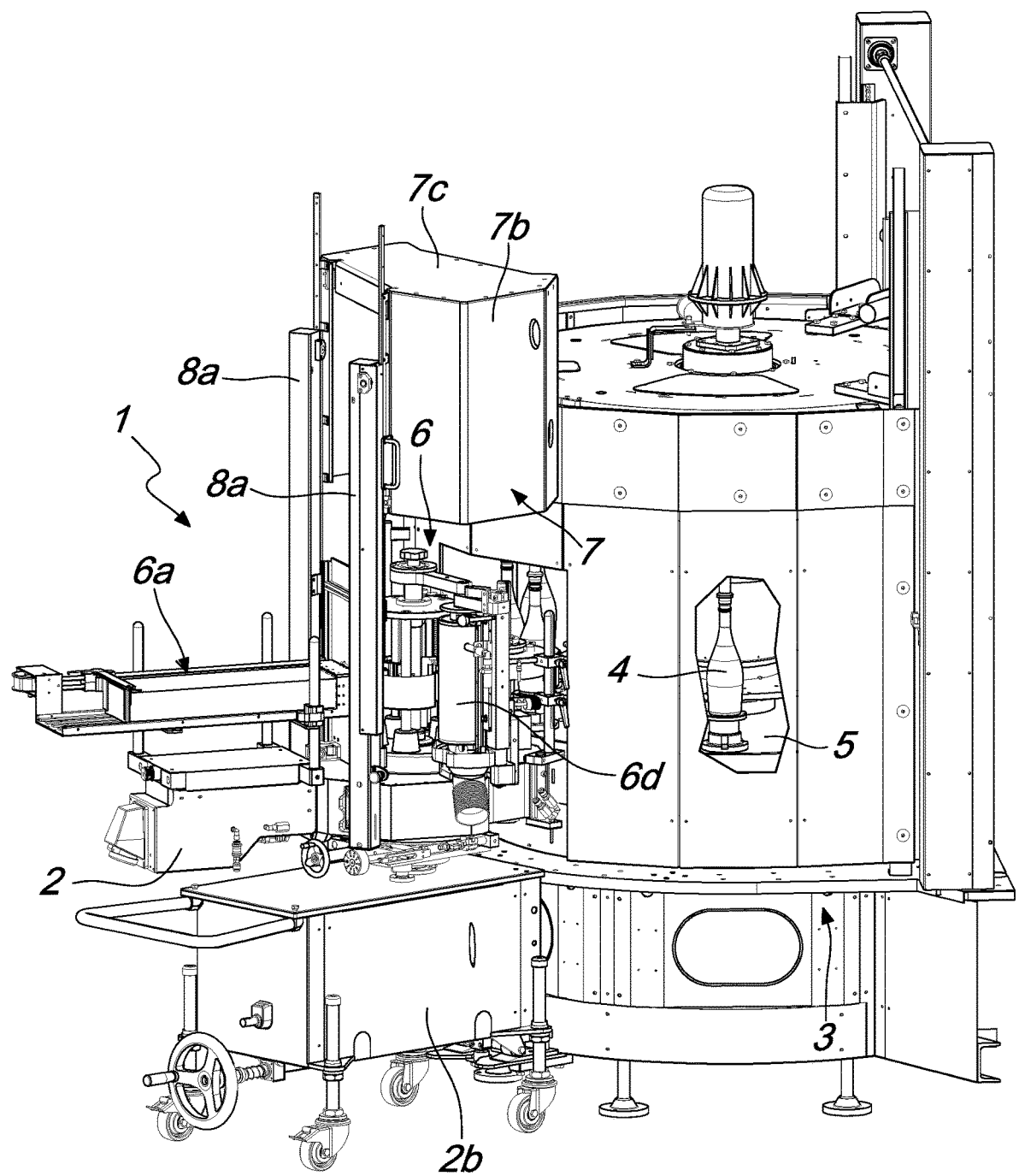
FIG. 10 shows the embodiment of FIG. 9 with the protective body in the inactive position and with parts of the conveyor shown in cutaway in order to show the containers in transit thereon.

The base frame 2 can be, optionally, stably coupled to the fixed framework of the conveyor 3 and placed on the floor by way of a pedestal 2a, as in the embodiment in FIGS. 7 and 8, or it can also be detachably connected to the fixed framework of the conveyor 3 and, in such case, it can be conveniently supported by a trolley 2b for movement and conveyance, as in the embodiment in FIGS. 9 and 10.

In particular, the base frame 2 supports the labeling means 6 that make it possible to affix labels on the individual containers 4 transiting along the conveyor 3.

For example, as in the embodiments shown, the labeling means 6 can comprise a magazine 6a of labels to be applied, a device 6b for taking the labels from the magazine 6a and at least one device 6c for applying the labels to the containers 4, all of which are conventional. Conveniently, between the pickup device 6b and the application device 6c an adhesive roller 6d is provided, which is designed to apply a layer of adhesive to the labels.

Alternatively, according to other possible embodiments, not shown, the labeling means 6 can optionally comprise a spool of backing for labels, or of film carrying printed labels, and at least one label application drum, for applying the labels obtained from such tape or film onto the containers 4, or they can be structured in any other manner that is known per se.

The labeling assembly 1 comprises, furthermore, means for at least partially delimiting the work area of the labeling means 6, which make it possible to prevent access to such work area, in particular when the labeling means 6 are in operation.

Figure 2:
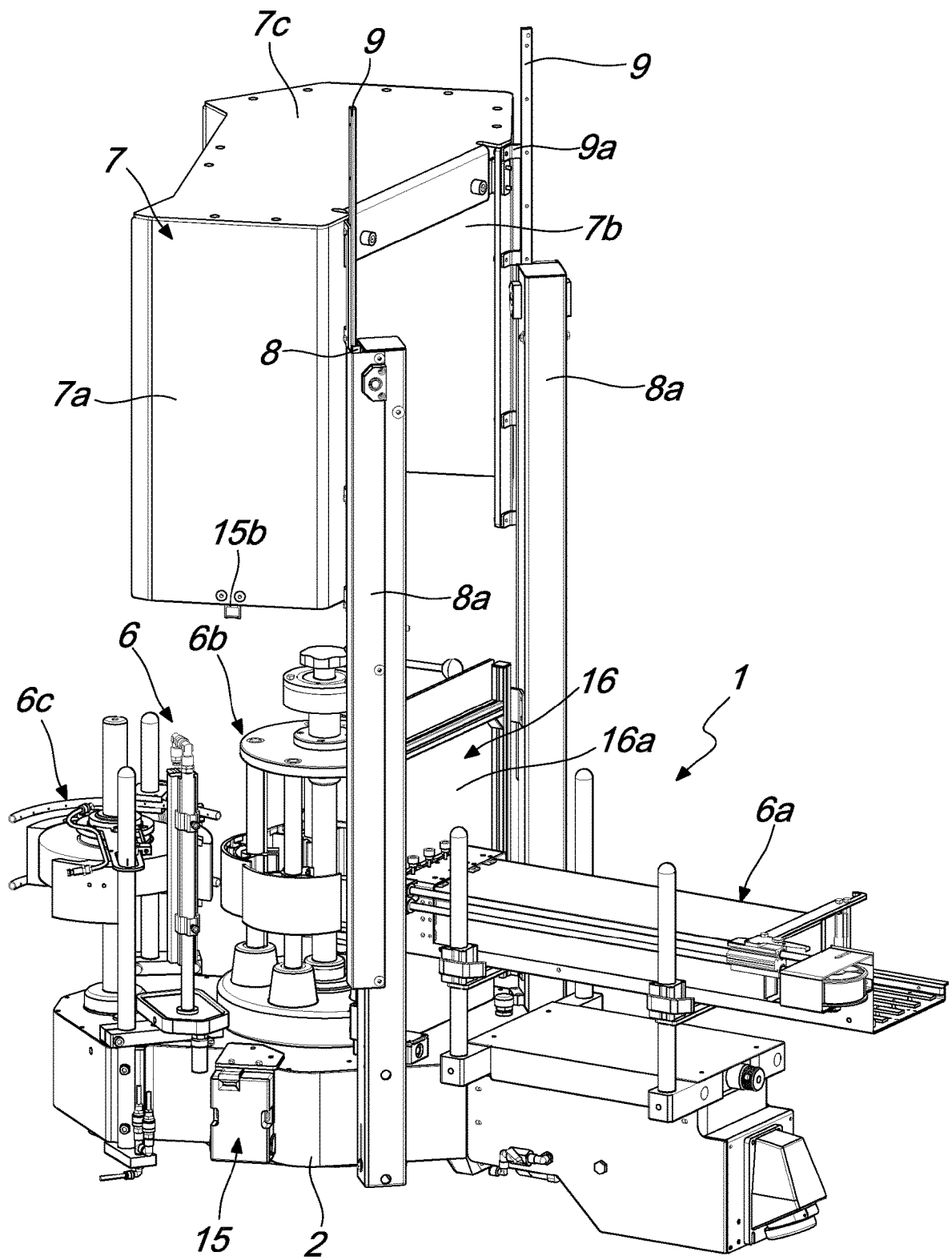
FIG. 2 is a partial perspective view of the labeling assembly according to the invention with the protective body in an inactive position.

According to the invention, such delimiting means comprise at least one protective body 7 which can move slideably, with respect to the base frame 2, between an active position, shown for example in FIG. 1, in which the protective body 7 delimits at least partially the work area of the labeling means 6, and at least one inactive position, which is spaced with respect to the active position, in which free access is allowed from the outside to the work area of the labeling means 6, as shown for example in FIG. 2.

In more detail, the protective body 7 is, advantageously, mounted so that it can slide along one or more guides 8 that extend substantially vertically from the base frame 2, so as to allow the protective body 7 to pass from a lowered condition with respect to the base frame 2, in which the protective body 7 is in the active position, to a raised condition with respect to the base frame 2, in which the protective body 7 is instead in the inactive position, and vice versa.

Conveniently, each guide 8 is fixed to a respective post 8a that extends, substantially vertically, from the base frame 2 and is, advantageously, engaged slideably by a corresponding slider 9 which is fixed to the protective body 7, for example by way of adapted brackets 9a.

Optionally, the protective body 7 can be removably connected to the sliders 9.

Figure 19:
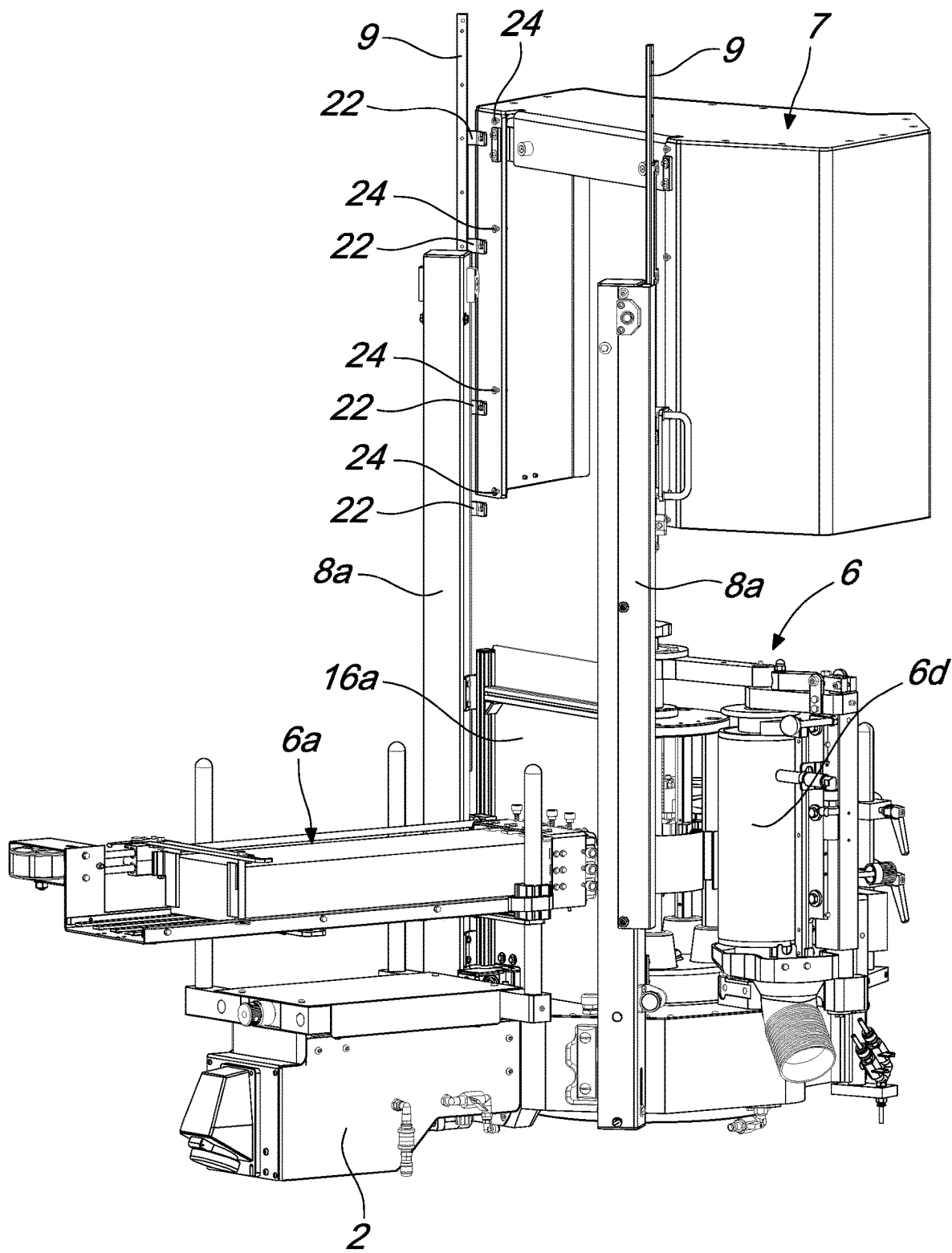
FIG. 19 is a perspective view of another embodiment of the labeling assembly according to the invention, in which the protective body is shown in the inactive position and separated from sliders.
Figure 20:
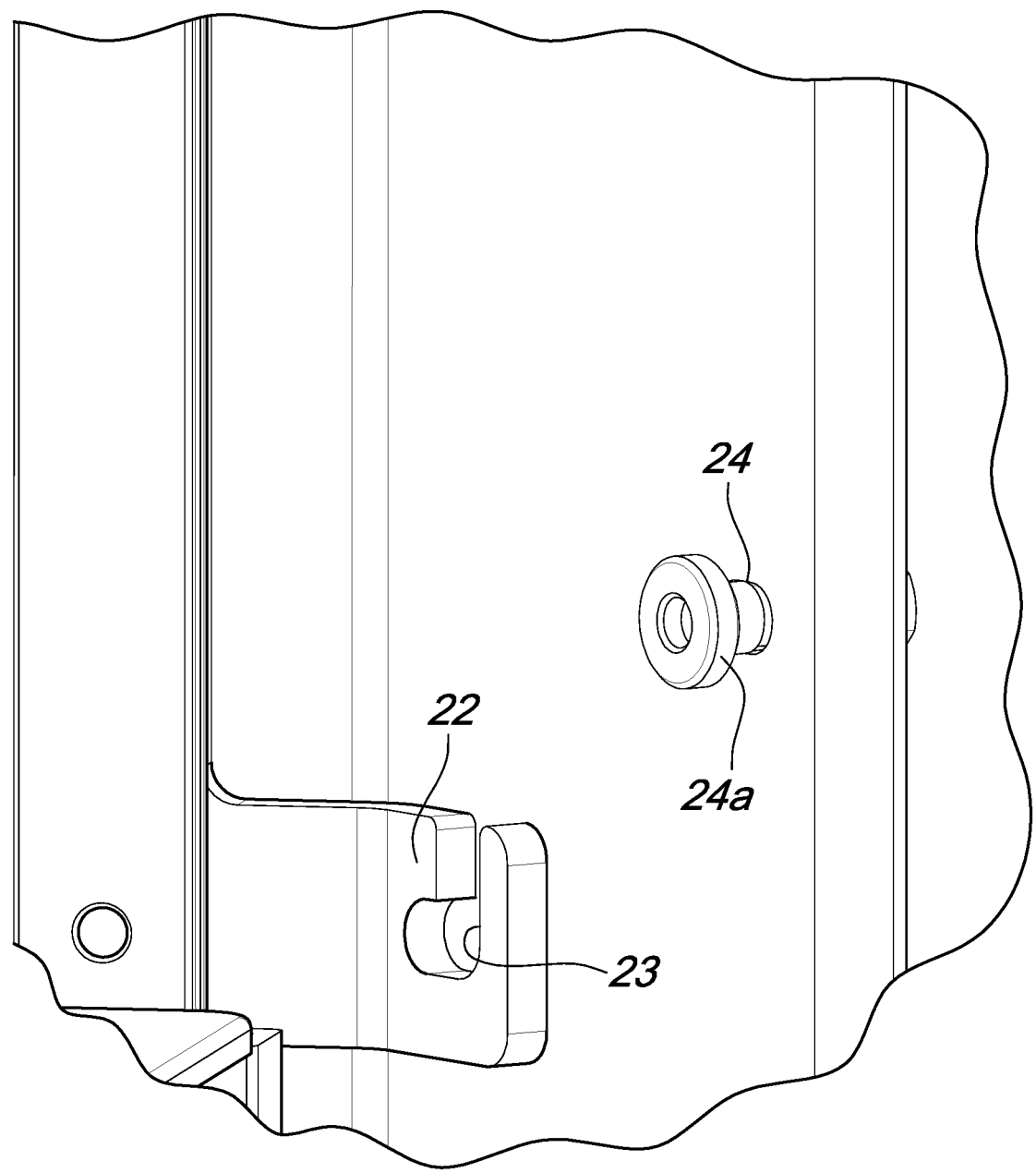
FIG. 20 shows a detail of the embodiment of FIG. 19 showing the rapid removable coupling means.

In particular, as shown in FIGS. 19 and 20, there can be, for example, rapid removable coupling means between the protective body 7 and the sliders 9.

As shown, in particular, in FIG. 20, such rapid removable coupling means can, advantageously, be provided by way of a plurality of coupling bodies 22, fixed to the sliders 9 and defining respective contoured slots 23, which are engageable by corresponding connection pins 24, fixed to the protective body 7 and provided with a widened head 24a.

As illustrated, the protective body 7 conveniently has at least two separate protective portions 7a and 7b, which are mutually opposite and are adapted to delimit respective mutually opposite sides of the work area of the labeling means 6.

In this manner, moving the protective body 7 from the active position to the inactive position makes it possible to free access to the work area of the labeling means 6 on both its opposite sides.

Preferably, the protective body 7 also has an upper protection portion 7c on its upper side.

Advantageously, in order to facilitate its movement by the operators along the guides 8 between the active position and the inactive position, the protective body 7 is connected to at least one counterweight 10.

Preferably, for each one of the guides 8, there is a corresponding counterweight 10 connected to the protective body 7.

Figure 3:
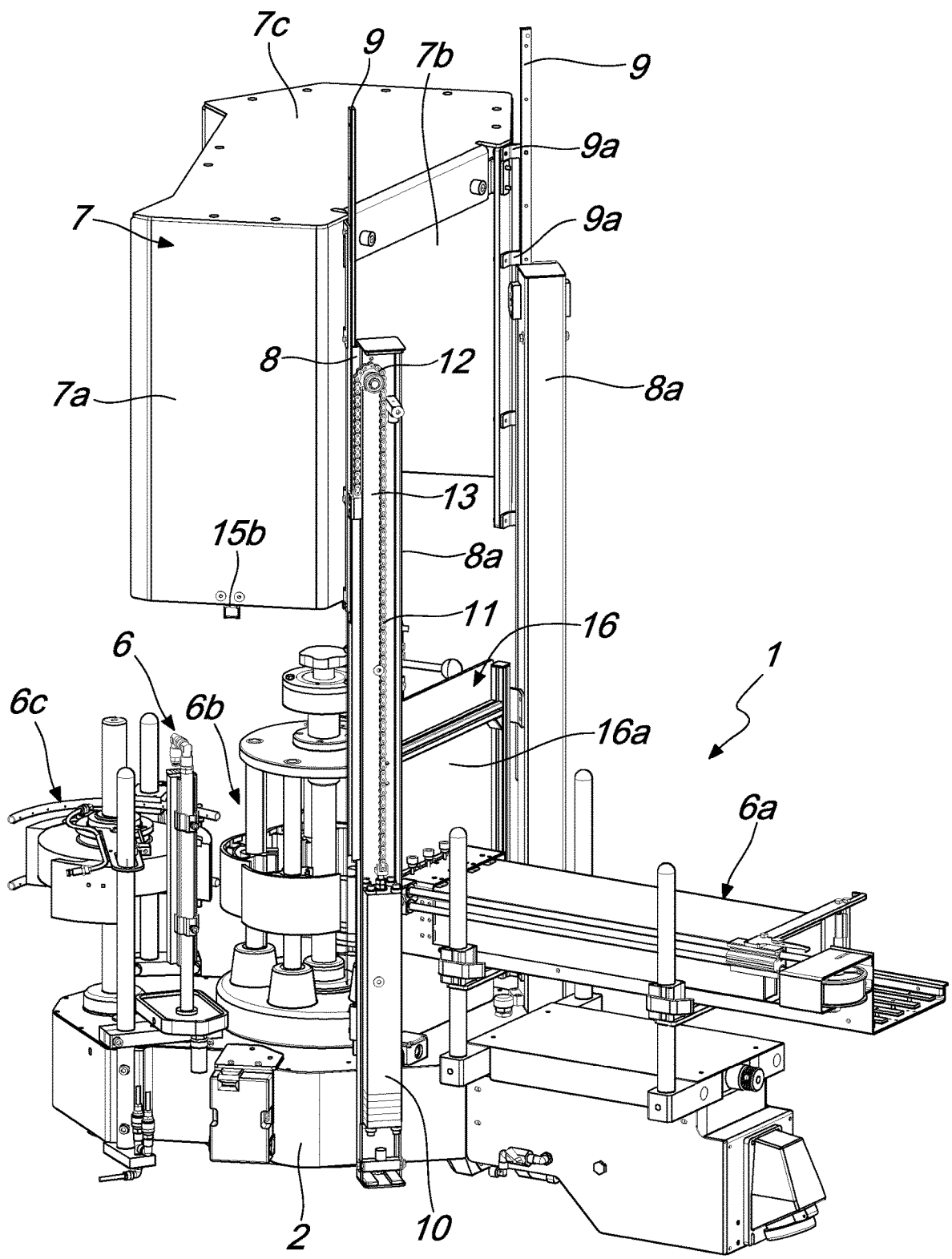
FIG. 3 is a partial perspective view of the labeling assembly according to the invention with the protective body in the inactive position and with parts removed to show the interior.

As shown in FIG. 3, each counterweight 10 is, conveniently, connected to the protective body 7 by way of a corresponding flexible elongated connecting element 11, such as for example a chain, a strap or the like, which is in engagement with a corresponding transmission pulley 12, which can rotate about its own axis with respect to the base frame 2 and is arranged substantially at an upper end of the corresponding guide 8. Advantageously, again as shown in FIG. 3, each counterweight 10 is accommodated in a sliding channel 13, which is defined axially inside the corresponding post 8a.

Figure 11:
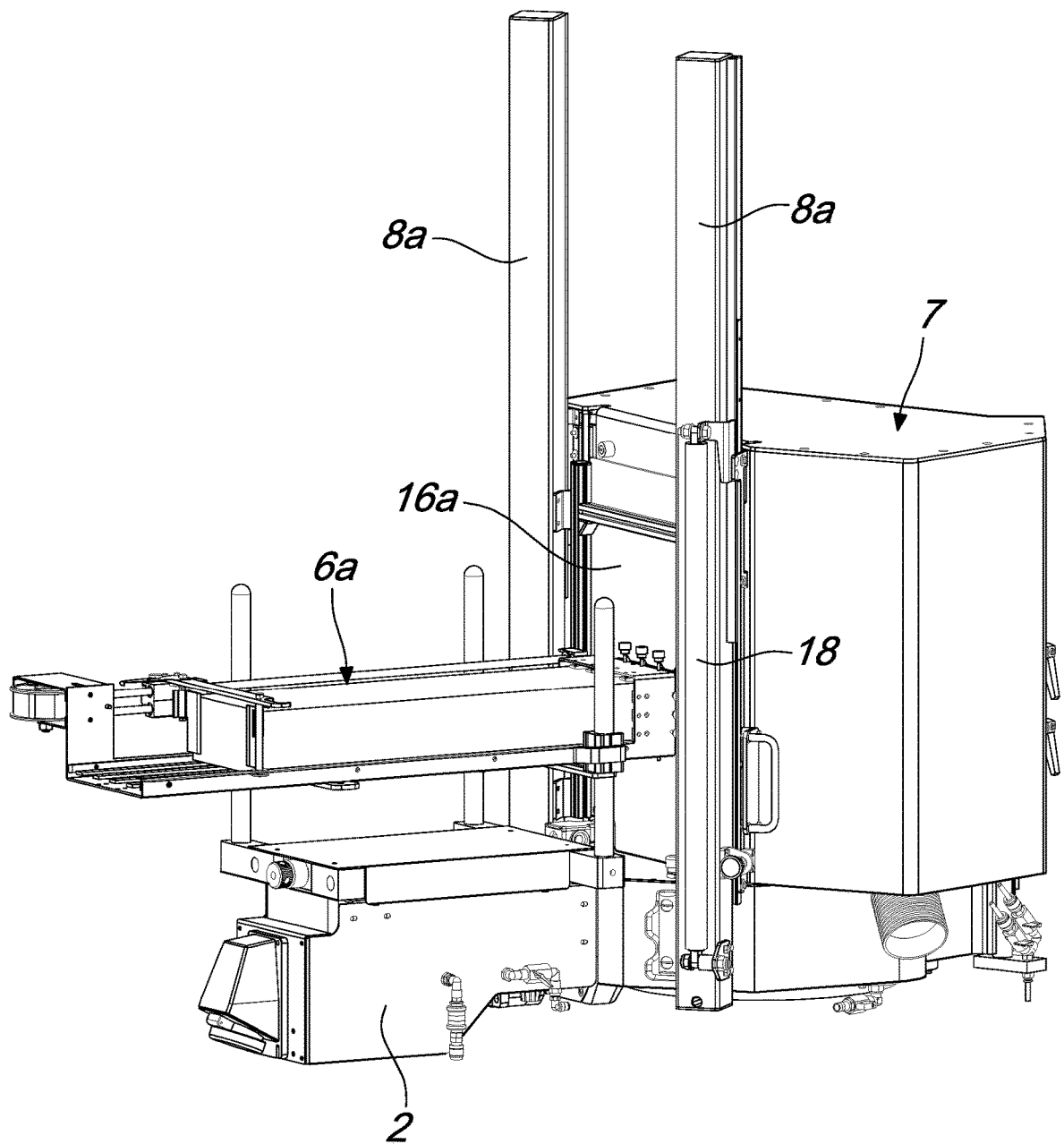
FIG. 11 is a perspective view of a different embodiment of the labeling assembly according to the invention.
Figure 12:
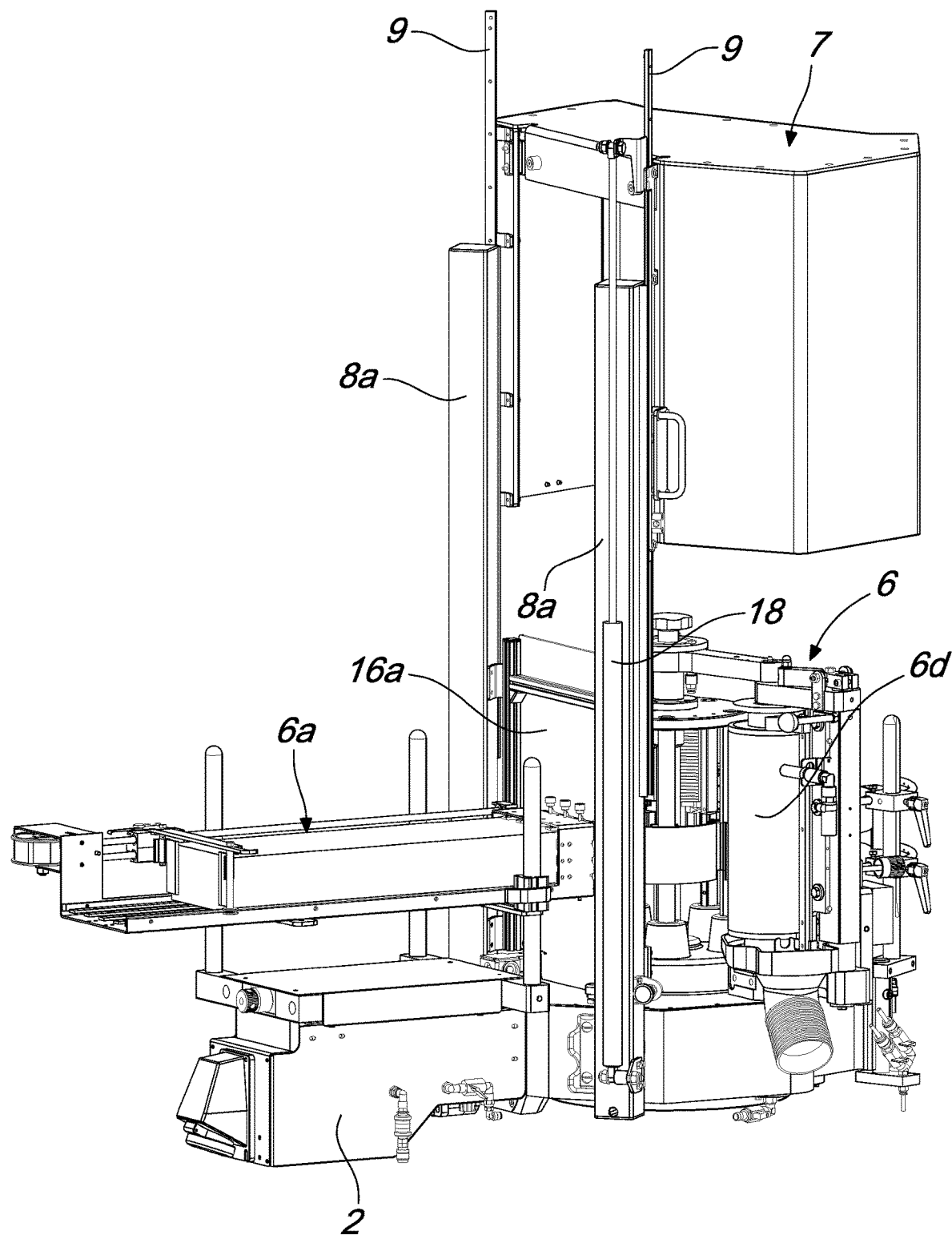
FIG. 12 is a perspective view of the embodiment of FIG. 11 with the protective body in the inactive position.

Optionally, as shown for example in FIGS. 11 and 12, at least one shock-absorbing device 18 can be conveniently associated with at least one of the guides 8 and act between the protective body 7 and the base frame 2, making it possible to exert a braking action on the movement of the protective body 7 between its active position and its inactive position.

Figure 5:
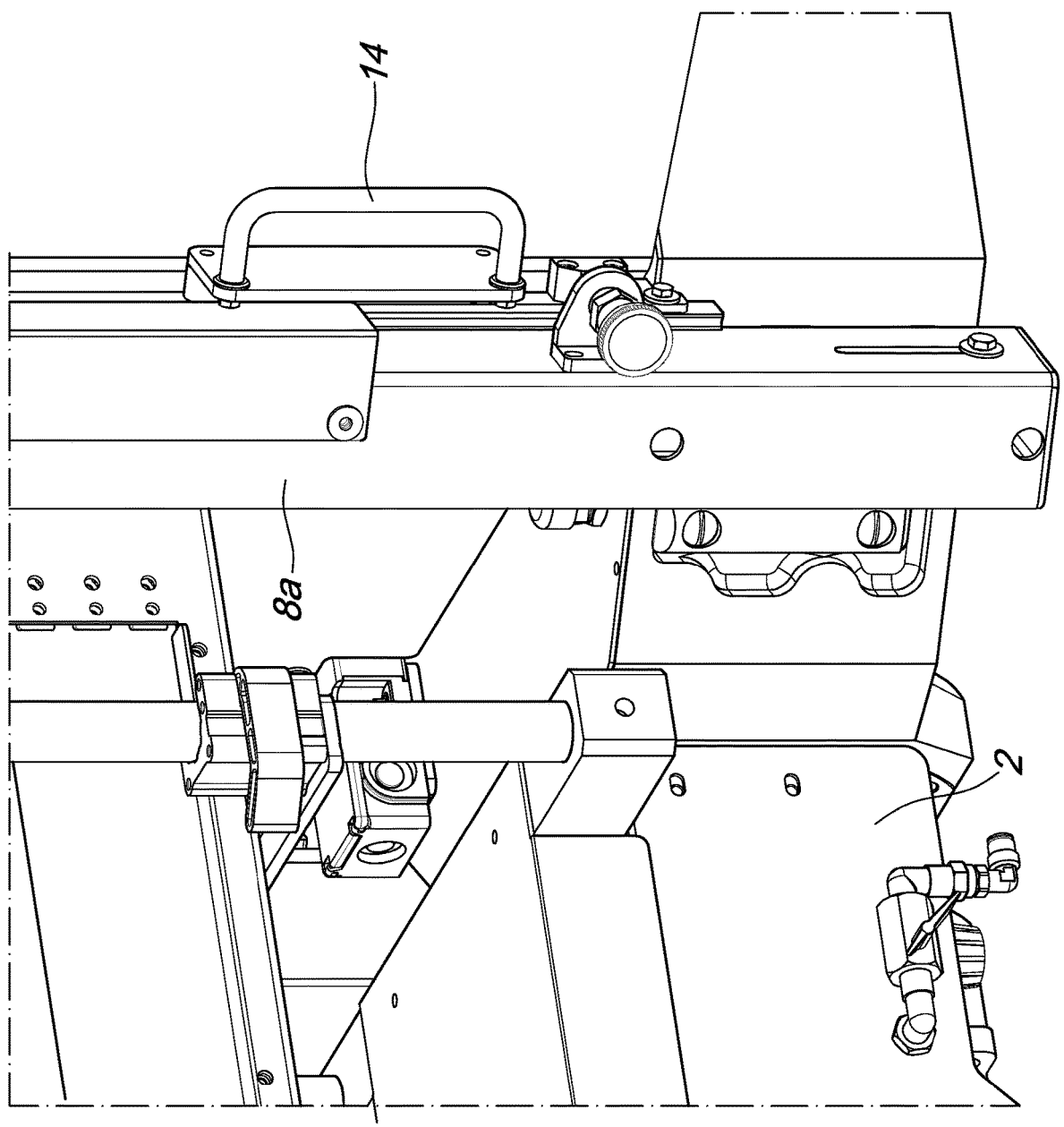
FIG. 5 is an enlarged-scale view of a detail of the labeling assembly according to the invention.
Figure 6:
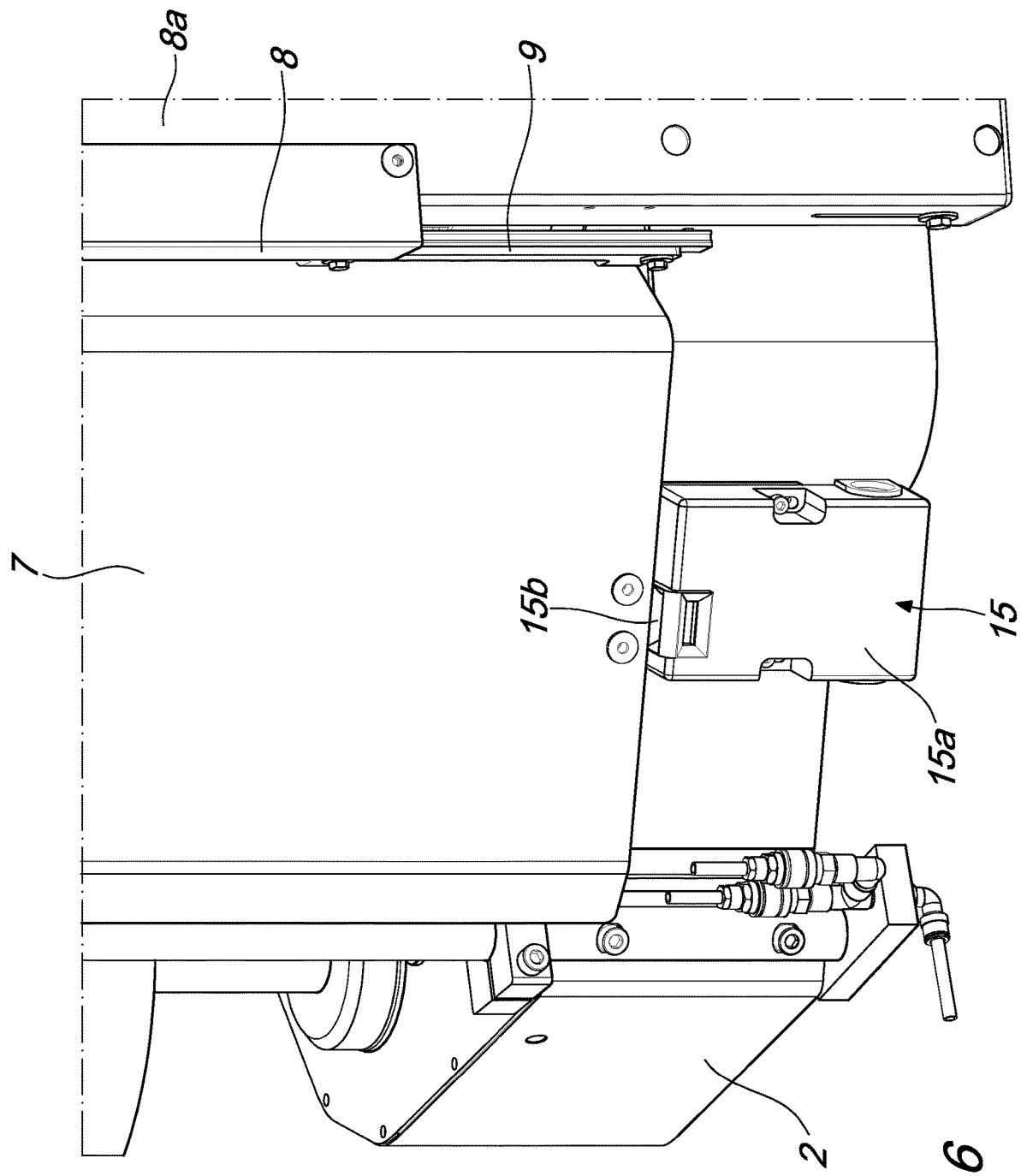
FIG. 6 is an enlarged-scale view of the detection means in the labeling assembly according to the invention.

As shown in particular in FIG. 5, at least one handle 14 is conveniently associated with the protective body 7 and can be gripped by the operator, in order to allow him/her to conveniently perform the sliding of the protective body 7, along the guides 8, between its active position and its inactive position.

Optionally, the movement of the protective body 7 between its active position and its inactive position can be actuated by way of actuation means.

Figure 17:
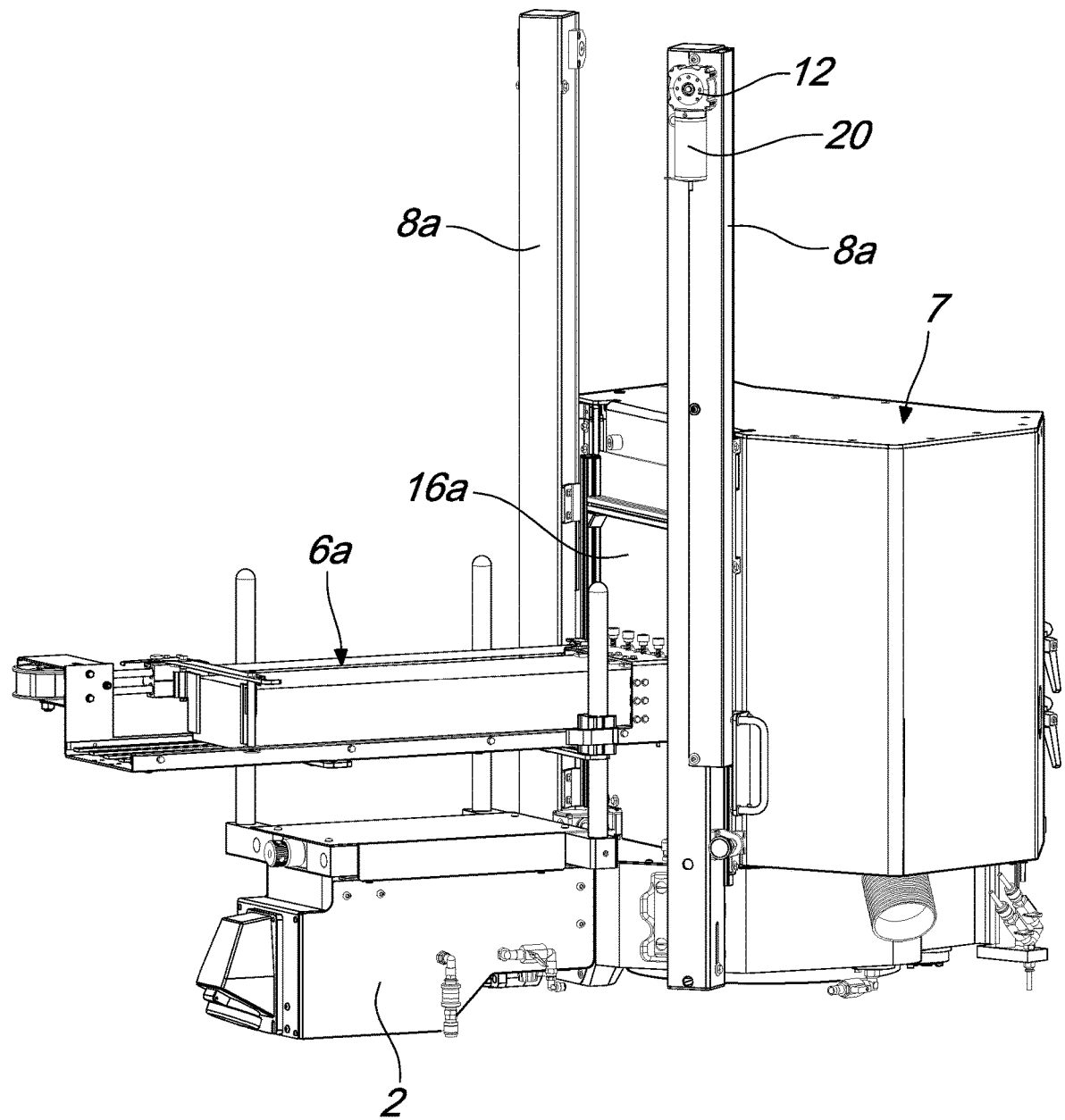
FIG. 17 is a perspective view of a variation of embodiment of the labeling assembly according to the invention.
Figure 18:
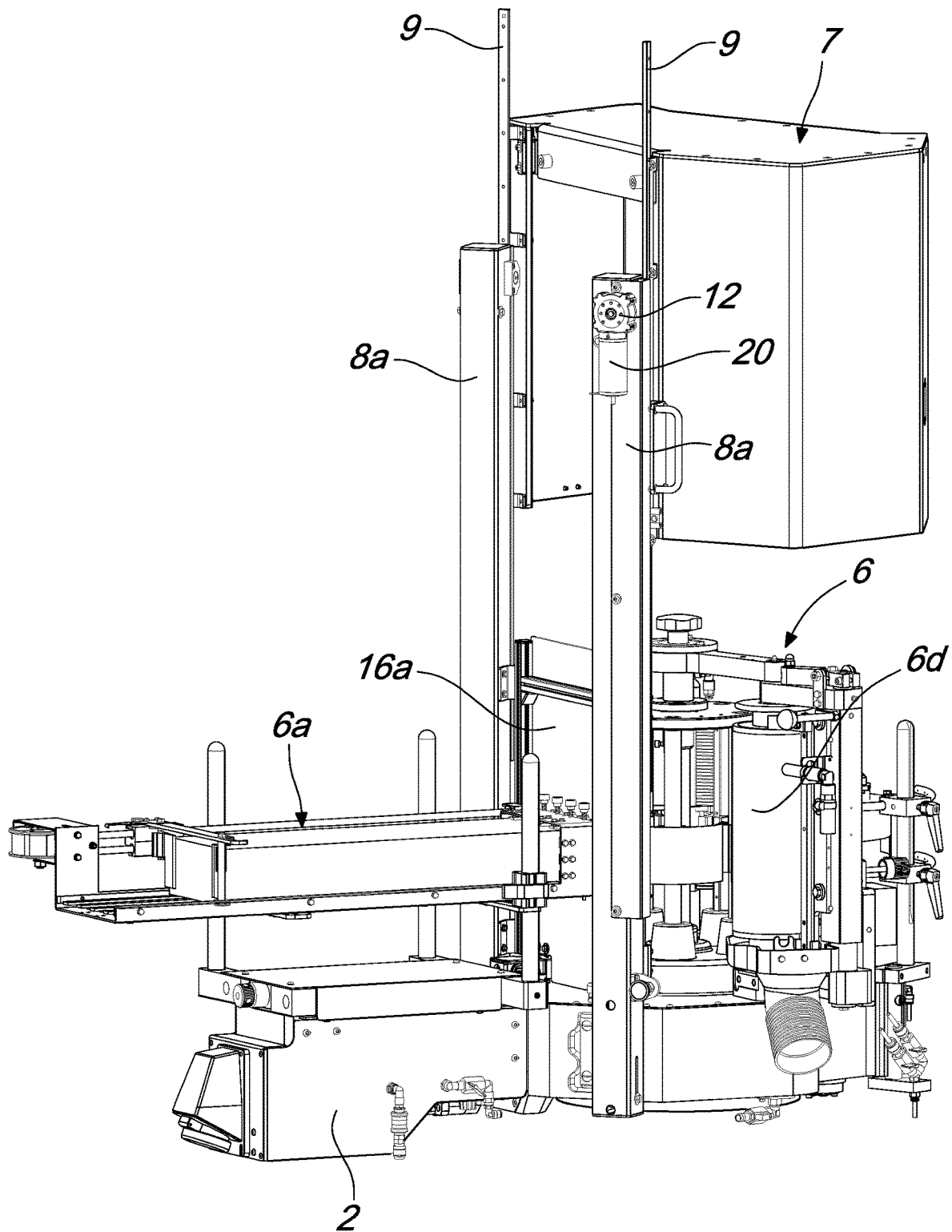
FIG. 18 is a perspective view of the variation of embodiment of FIG. 17 with the protective body in the inactive position.

For example, such actuation means comprise at least one motor 20 connected functionally to a respective transmission pulley 12, as shown in FIGS. 17 and 18.

According to a possible variation, the actuation means can comprise linear actuation means.

Figure 13:
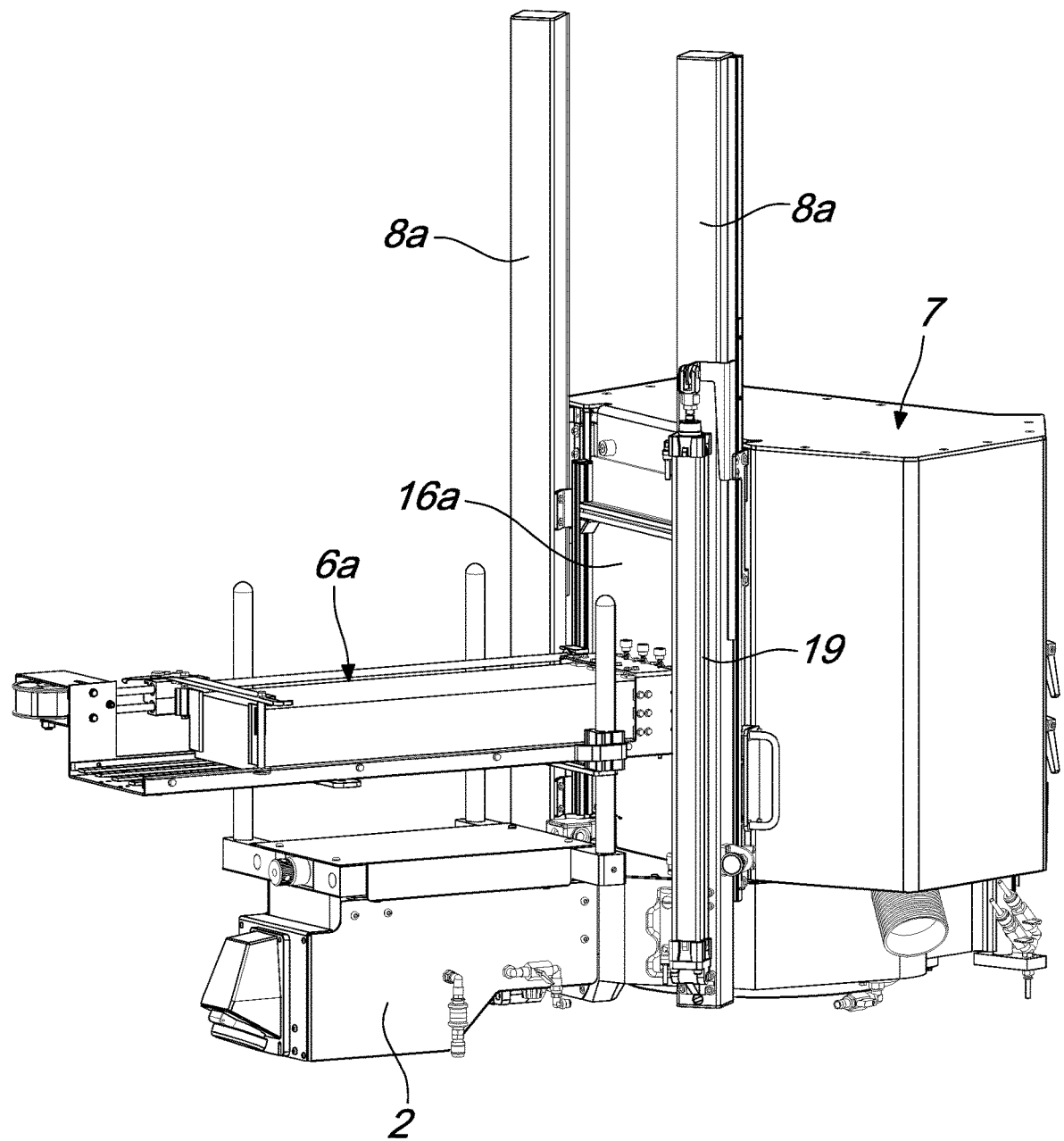
FIG. 13 is a perspective view of another different embodiment of the labeling assembly according to the invention.
Figure 14:
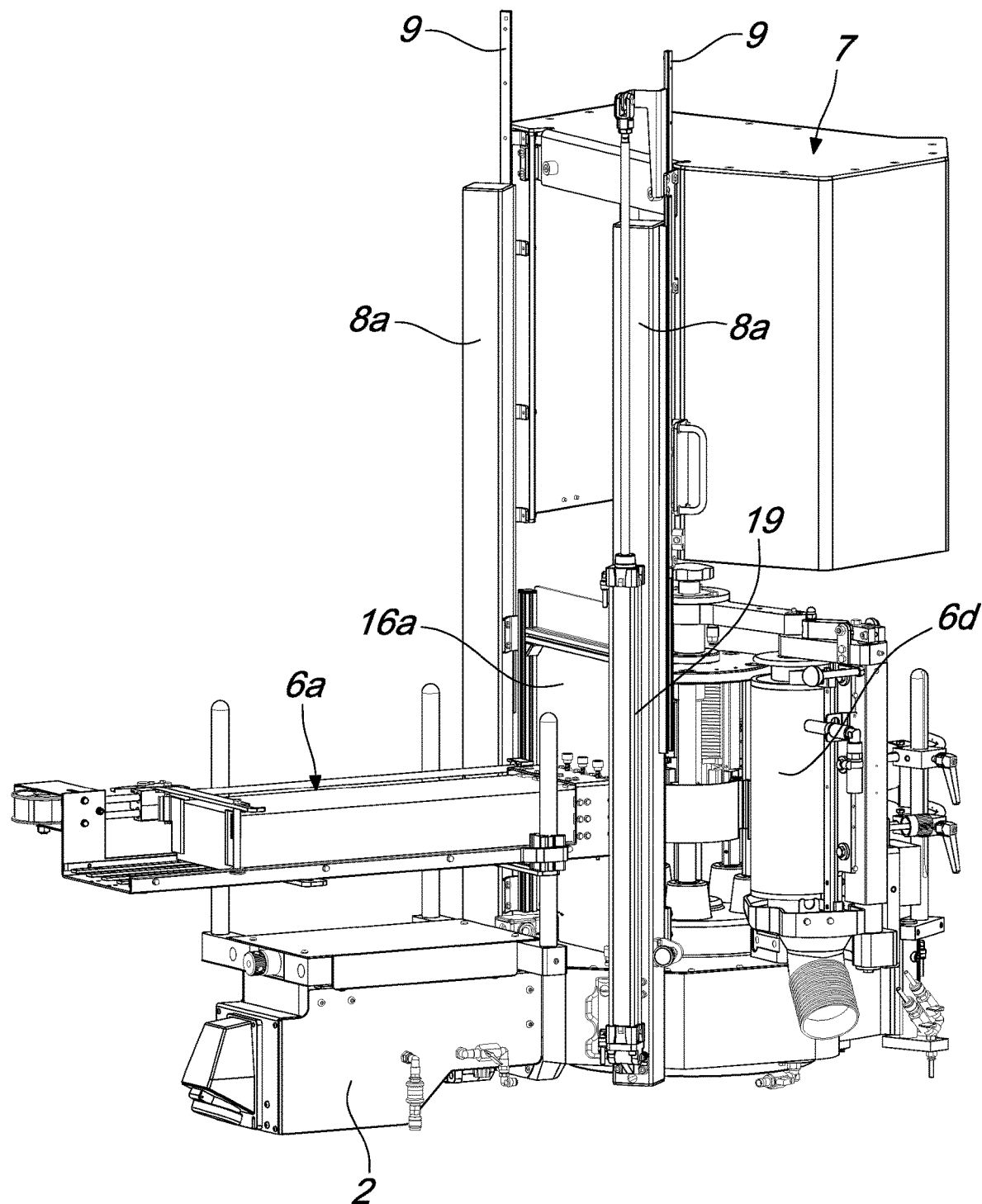
FIG. 14 is a perspective view of the embodiment of FIG. 13 with the protective body in the inactive position.
Figure 15:
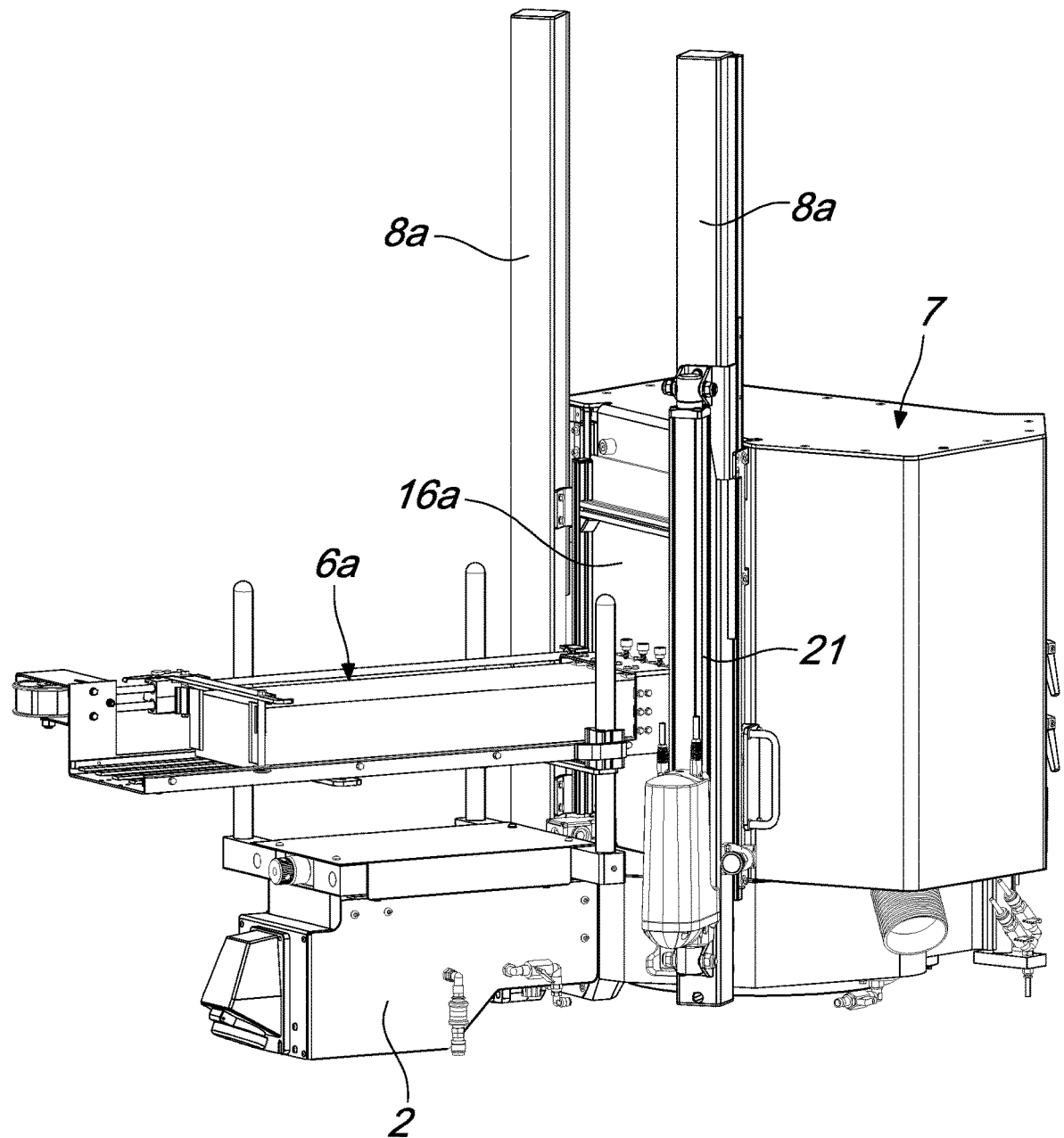
FIG. 15 is a perspective view of a further embodiment of the labeling assembly according to the invention.
Figure 16:
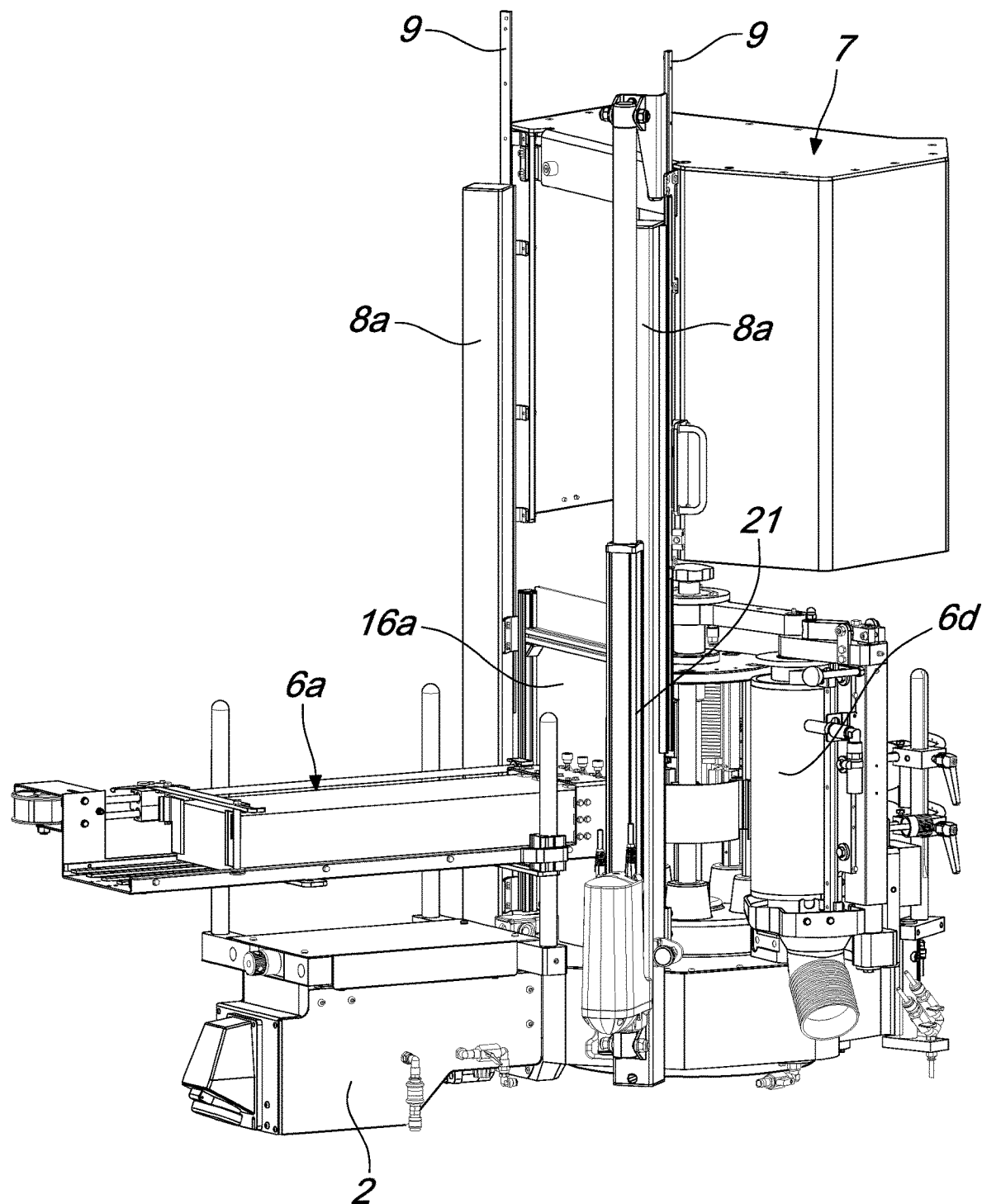
FIG. 16 is a perspective view of the embodiment of FIG. 15 with the protective body in the inactive position.

In particular, as shown in FIGS. 13 and 14, such linear actuation means can be constituted by at least one fluid-operated piston 19, articulated between the base frame 2 and a corresponding slider 9. Alternatively, the linear actuation means can be provided by a magnetic ring piston 21, acting between the base frame 2 and a corresponding slider 9, as illustrated in FIGS. 15 and 16.

Advantageously, means 15 of detection of the arrangement of the protective body 7 in the active position are further provided.

Conveniently, the detection means 15 are connected to means of control of the labeling means 6 which are adapted to enable the operation of the labeling means 6, when the protective body 7 is in its active position, and to disable the operation thereof, if the protective body 7 is moved away from the active position and brought, for example, to its inactive position.

In more detail, the detection means 15 comprise a first detector element 15a, fixed to the base frame 2, and a second detector element 15b, fixed to the protective body 7 and adapted to be coupled with the first detector element 15a, when the protective body 7 is in its active position.

In particular, the first detector element 15a conveniently has a female seat, while the second detector element 15b has a male element adapted to be removably inserted into the female seat of the first detector element 15a, when the protective body 7 is in its active position.

Advantageously, the control means of the labeling means 6 connected to the detection means 15 can be constituted by switching means adapted to enable/disable the electric power supply of the labeling means 6.

More specifically, such switching means are in the open condition and, therefore, capable of disabling the electric power supply of the labeling means 6, when the first detector element 15a is uncoupled from the second detector element 15b and, as a consequence, when the protective body 7 is in its inactive position, while the switching means are in the closed condition, with consequent enabling of the electric power supply of the labeling means 6, when the first detector element 15a is coupled to the second detector element 15b and, therefore, the protective body 7 is in the active position.

Figure 4:
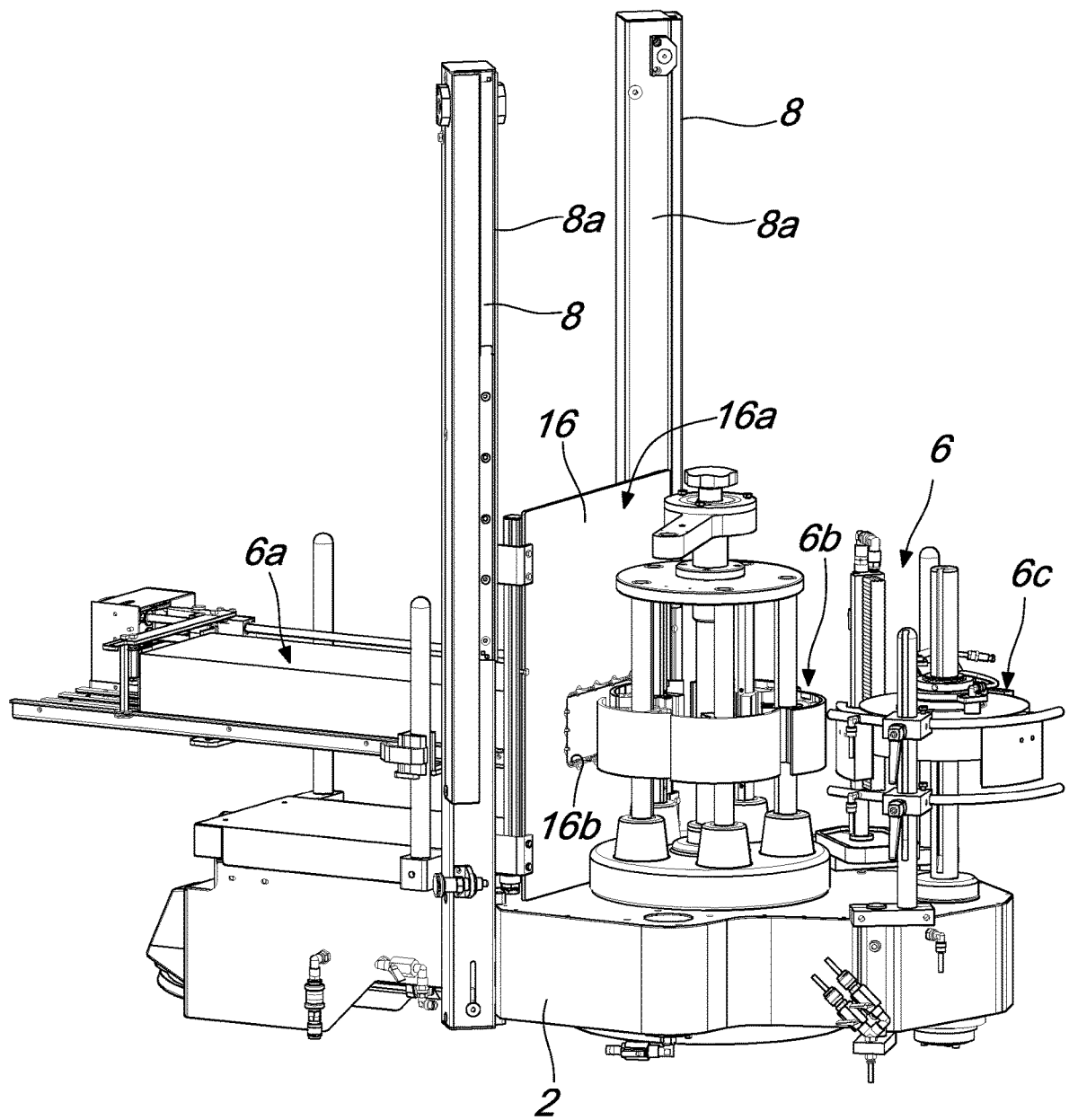
FIG. 4 shows a portion of the labeling assembly according to the invention in which a protective body has been omitted, for the sake of simplicity.

As shown in particular in FIG. 4, on the side of the protective body 7 directed toward the magazine 6a there can be an additional protective body 16 supported by the base frame 2 and constituted for example by a panel 16a, conveniently provided with an opening 16b which makes it possible to connect the magazine 6a with the device 6b for taking the labels from the magazine.

Conveniently, in order to allow access to the pickup device 6b, in the event of necessary intervention for maintenance, repair or change of format, the panel 16a can be removed individually from the base frame 2 or it can also be slideably moved with respect to the base frame 2 between a lowered condition, like that shown in FIG. 4, in which it is interposed between the magazine 6a and the pickup device 6b, and a raised condition, in which it permits easy access from outside to the area affected by the device 6b for taking the labels. In this latter case, the panel 16a can conveniently be coupled slideably to corresponding guide elements that are supported by the posts 8a.

Figure 21:
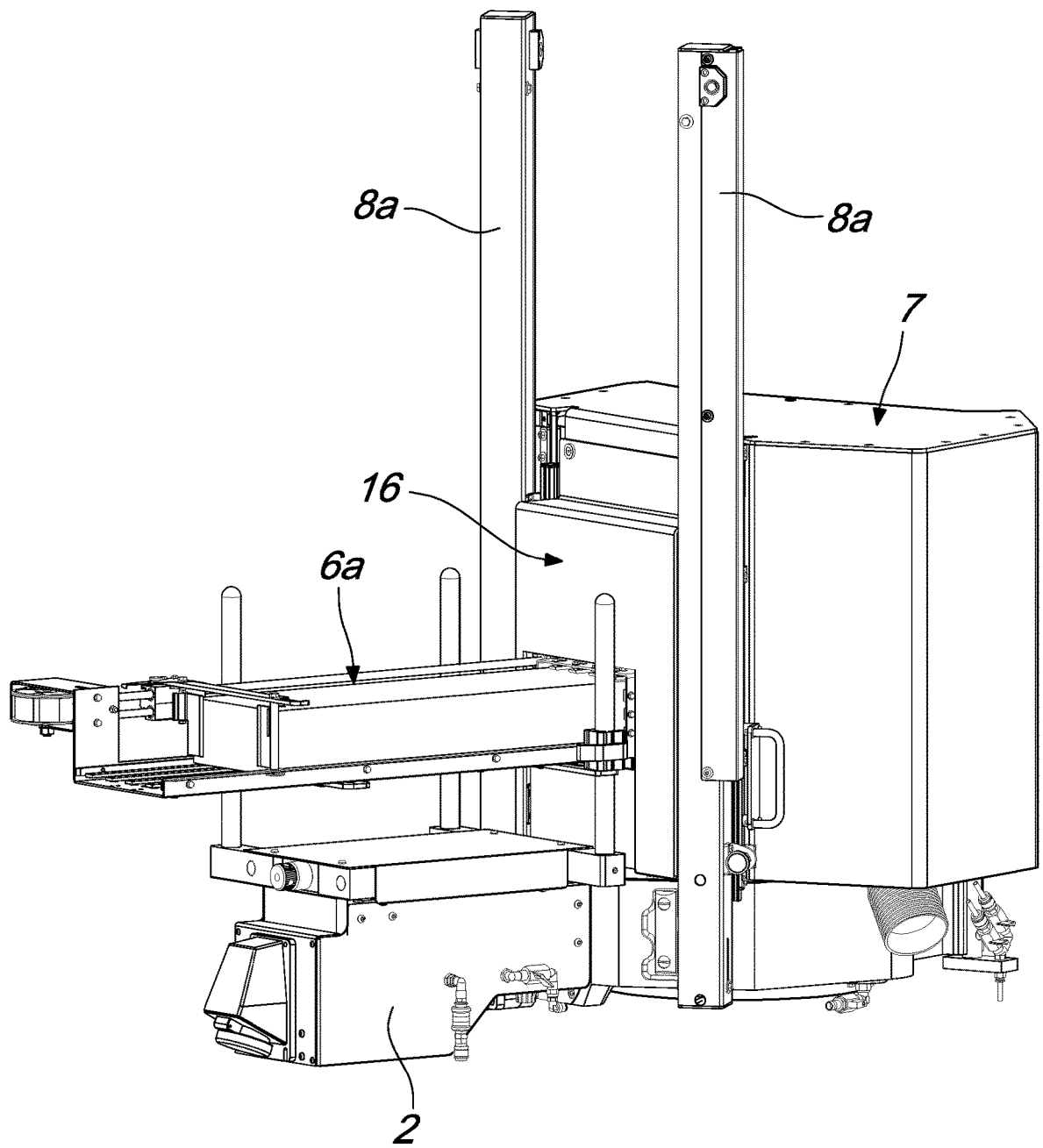
FIG. 21 is a perspective view of a different embodiment of the labeling assembly according to the invention.
Figure 22:
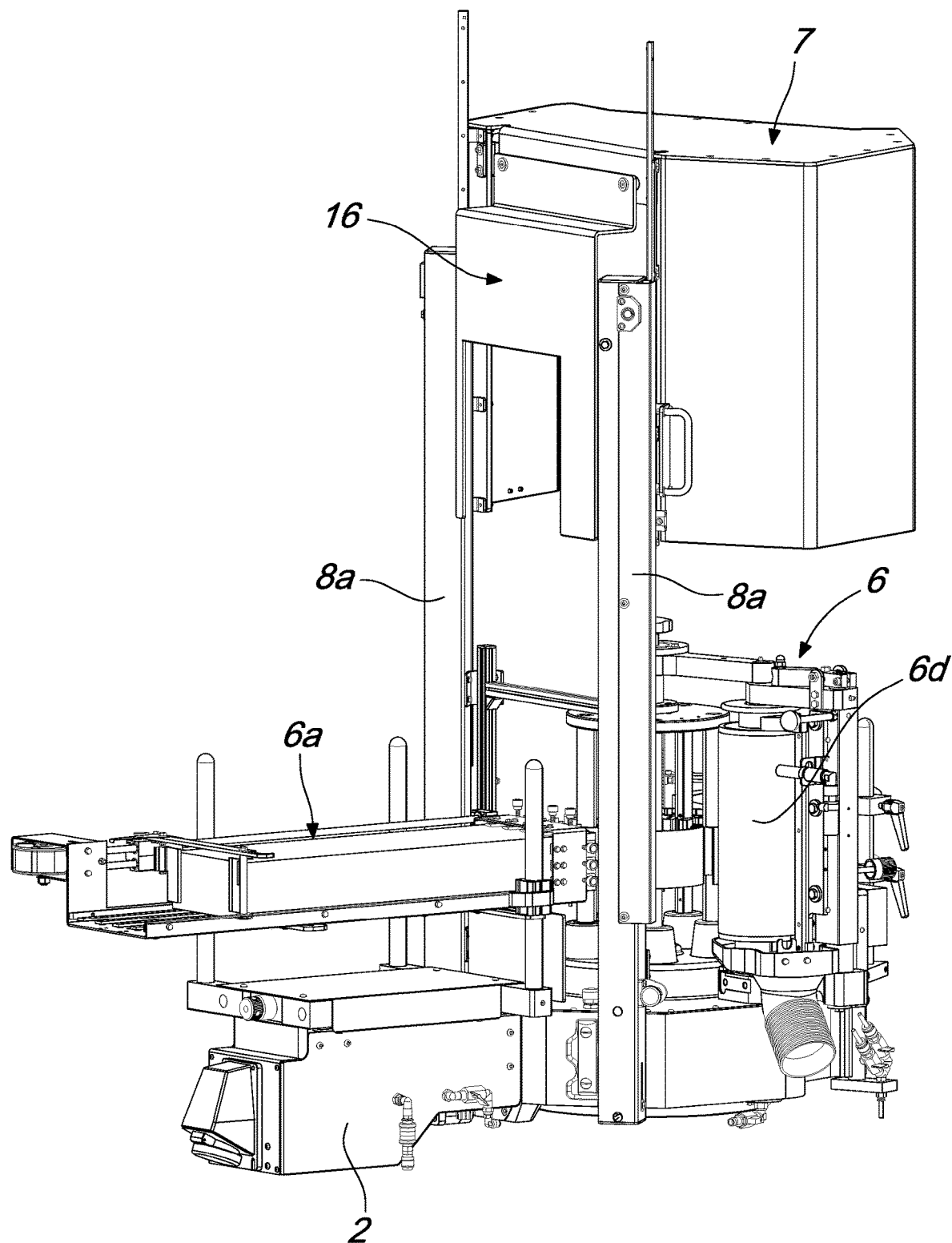
FIG. 22 is a perspective view of the embodiment of FIG. 21 with the protective body in the inactive position.

Alternatively, as shown in FIGS. 21 and 22, the additional protective body 16 can also be integrally connected to the protective body 7, so that it can be moved with the protective body 7 between the active position and the inactive position.

Operation of the labeling assembly according to the invention is the following.

With the labeling assembly associated with the conveyor 3 of the containers 4, the operator brings the protective body 7 to the lowered condition with respect to the base frame 2, so as to arrange it in its active position, so that it can delimit the work area of the labeling means 6.

In such condition, the detection means 15 allow the means of control of the labeling means 6 to enable the operation of the labeling means 6, so as to allow the application of the labels on the containers 4 transiting on the conveyor 3.

If it becomes necessary to intervene for maintenance, repair or change of format on the labeling means 6, the operator, with a simple operation, moves the protective body 7 to the inactive position, by making it slide along the guides 8, with the aid of the handles 14, or by activating the actuation means, so as to bring it to the raised condition with respect to the base frame 2, thus completely freeing access to the work area of the labeling means 6, without problems of hindrance by the protective body 7.

In such situation, the means of control of the labeling means 6 disable the operation of the labeling means 6, so as to prevent accidents to operators owing to elements in motion.

Once the necessary interventions on the labeling means 6 are finished, the operator can return, with an equally simple operation, the protective body 7 to the lowered condition with respect to the base frame 2, by making it slide along the guides 8 or by again activating the actuation means, until it is brought back to the active position.

In practice it has been found that the invention is capable of fully achieving the set aim and objects.

All the characteristics of the invention, indicated above as advantageous, convenient or similar, may also be missing or be substituted by equivalent characteristics.

The individual characteristics set out in reference to general teachings or to specific embodiments may all be present in other embodiments or may substitute characteristics in such embodiments.

The invention, thus conceived, is susceptible of numerous modifications and variations, all of which are within the scope of the appended claims.

In practice the materials employed, provided they are compatible with the specific use, and the dimensions and shapes, may be any according to requirements.

Moreover, all the details may be substituted by other, technically equivalent elements.

The disclosures in Italian Patent Application No. 102015000080271 (UB2015A006259) from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A labeling assembly for labeling machines, which comprises a base frame which is adapted to be associated with a conveyor of containers to be labeled and which supports means for labeling said containers, means for at least partially delimiting a work area of said means for labeling said containers, wherein said means for at least partly delimiting the work area comprise a first protective body which can move slideably, with respect to said base frame, between an active position, in which said first protective body is adapted to delimit at least partially the work area of said means for labeling said containers, and at least one inactive position, which is spaced above said active position, in which said first protective body allows access from the outside to the work area of said means for labeling said containers;

wherein said means for labeling containers includes a label pickup device in the work area;

wherein a label magazine is provided outside the work area;

wherein a second protective body is interposed between the label magazine and the label pickup device, wherein the second protective body includes an opening through which the label magazine feeds labels to the label pickup device.

2. The labeling assembly according to claim 1, wherein said first protective body is mounted so that it can slide along at least one guide which extends substantially vertically from said base frame, in order to pass from a lowered condition with respect to said base frame, in which said first protective body is in said active position, to a raised condition with respect to said base frame, in which said first protective body is in said inactive position, and vice versa.

3. The labeling assembly according to claim 1, wherein said first protective body forms at least two protective portions which are mutually opposite and are adapted to delimit respective mutually opposite sides of the work area of said means for labeling said containers.

4. The labeling assembly according to claim 1, wherein said first protective body is connected to at least one counterweight.

5. The labeling assembly according to claim 4, wherein said first protective body is connected to said at least one counterweight by way of a flexible elongated connecting element that engages a transmission pulley, which can rotate about its own axis with respect to said base frame and is arranged substantially at an upper end of at least one guide.

6. The labeling assembly according to claim 1, further comprising at least one shock-absorbing device, which acts between said first protective body and said base frame.

7. The labeling assembly according to claim 1, further comprising actuation means adapted to move said first protective body between said active position and said inactive position.

8. The labeling assembly according to claim 1, wherein said second protective body is integral with said first protective body.

9. The labeling assembly according to claim 1, further comprising means for detecting the arrangement of said first protective body in said active position.

10. The labeling assembly according to claim 9, wherein said means for detecting the arrangement of said first protective body in said active position are connected to means of control of said labeling means which are adapted to enable the operation of said means for labeling said containers with said first protective body in said active position.

11. A labeling assembly for labeling machines, which comprises a base frame which is adapted to be associated with a conveyor of containers to be labeled and which supports a labeling device that includes a label applier located within a work area where labels will be applied to containers, a first protective body mounted for sliding movement with respect to the base frame, between a lowered active position, in which the first protective body is adapted to delimit at least partially the work area of the label applier, and at least one raised inactive position, which is spaced above the lowered active position, in which the first protective body allows external access to the work area of the label applier;
wherein the first protective body includes first and second side portions and an upper portion, wherein, when the first protective body is in the lowered active position, the first and second side portions delimit respective first and second lateral sides of the work area and the upper portion extends over and delimits an upper side of the work area, wherein the first and second side portions and the upper portion are interconnected for movement with each other;
wherein the labeling device includes a label pickup device in the work area;
wherein a label magazine feeds labels to the label pickup device;
wherein a second protective body is interposed between the label magazine and the label pickup device, wherein the second protective body includes an opening through which the label magazine feeds labels to the label pickup device.

12. The labeling assembly according to claim 11, wherein the first protective body is mounted so that it can slide along at least one guide which extends substantially vertically from the base frame, in order to pass from the lowered active position, to the raised inactive position.

13. The labeling assembly according to claim 11, wherein the first protective body is connected to a counterweight.

14. The labeling assembly according to claim 13, wherein the first protective body is connected to the counterweight by way of a flexible elongated connecting element that engages a transmission pulley, which can rotate about its own axis with respect to the base frame and is arranged substantially at an upper end of at least one guide.

15. The labeling assembly according to claim 11, further comprising a detector that detects when the first protective body in the active position.

16. The labeling assembly according to claim 15, wherein the detector is connected to a control which is adapted to enable the operation of the label applier when the first protective body in the active position and to disable the label applier when the first protective body is not in the active position.

17. A labeling assembly for labeling machines, which comprises a base frame which is adapted to be associated with a conveyor of containers to be labeled and which supports a labeling device that includes a label pickup device and a label applier located within a work area where labels will be applied to containers, a first protective body mounted for sliding movement with respect to the base frame, between a lowered active position, in which the first protective body is adapted to delimit at least partially the work area of the label applier, and at least one raised inactive position, which is spaced above the lowered active position, in which the first protective body allows external access to the work area of the label applier, a label magazine, positioned outside the work area, for feeding labels to the label pickup device, a second protective body interposed between the label magazine and the label pickup device, wherein the second protective body includes an opening through which the label magazine feeds labels to the label pickup device.

18. The labelling assembly according to claim 17, wherein the first protective body includes an upper portion, wherein, when the first protective body is in the lowered active position, the upper portion extends over and delimits an upper side of the work area.

19. The labeling assembly according to claim 18, wherein the first protective body includes at least one side portion extending downward from the upper portion, wherein, when the first protective body is in the lowered active position, the at least one side portion delimits at least one side of the work area, wherein the upper portion and the at least one side portion are interconnected for movement with each other.

20. The labeling assembly according to claim 18, wherein the labeling device further includes an adhesive roller for applying adhesive to said labels, wherein the adhesive roller is located in the work area.

* * * * *